United States Patent
Hatori et al.

(10) Patent No.: US 9,964,704 B2
(45) Date of Patent: May 8, 2018

(54) SPOT SIZE CONVERTER, LIGHT SOURCE, OPTICAL TRANSMITTER, OPTICAL RECEIVER AND OPTICAL TRANSMITTER-RECEIVER

(71) Applicants: FUJITSU LIMITED, Kawasaki-shi, Kanagawa (JP); NEC Corporation, Minato-ku, Tokyo (JP)

(72) Inventors: Nobuaki Hatori, Tsukuba (JP); Masashige Ishizaka, Tokyo (JP); Takanori Shimizu, Tokyo (JP)

(73) Assignees: FUJITSU LIMITED, Kawasaki (JP); NEC CORPORATION, Tokyo (JP)

( * ) Notice: Subject to any disclaimer, the term of this patent is extended or adjusted under 35 U.S.C. 154(b) by 460 days.

(21) Appl. No.: 14/165,876

(22) Filed: Jan. 28, 2014

(65) Prior Publication Data
US 2014/0233901 A1    Aug. 21, 2014

(30) Foreign Application Priority Data

Feb. 15, 2013   (JP) .................................. 2013-027474

(51) Int. Cl.
   *G02B 6/122*   (2006.01)
   *G02B 6/43*    (2006.01)
   *G02B 6/12*    (2006.01)

(52) U.S. Cl.
   CPC ............. *G02B 6/1228* (2013.01); *G02B 6/43* (2013.01); *G02B 2006/12061* (2013.01)

(58) Field of Classification Search
   CPC ................... G02B 6/1228; G02B 6/305
   See application file for complete search history.

(56) References Cited

U.S. PATENT DOCUMENTS

| | | | |
|---|---|---|---|
| 6,411,764 B1 * | 6/2002 | Lee | G02B 6/1228 372/50.1 |
| 6,937,797 B2 | 8/2005 | Mizuno | |
| 8,351,751 B2 * | 1/2013 | Yamamoto | G02B 6/138 156/275.5 |
| 8,744,225 B2 * | 6/2014 | Yoshida | G02B 6/125 385/43 |
| 2002/0154863 A1 | 10/2002 | Mizuno | |
| 2004/0052467 A1 * | 3/2004 | Blauvelt | B82Y 20/00 385/50 |
| 2010/0040327 A1 | 2/2010 | Deki et al. | |

FOREIGN PATENT DOCUMENTS

| | | |
|---|---|---|
| GB | 2369449 A | 5/2002 |
| JP | 2001-350046 A | 12/2001 |
| JP | 2002-162528 A1 | 6/2002 |
| JP | 2005-140822 A | 6/2005 |
| WO | 2008/114624 A1 | 9/2008 |

OTHER PUBLICATIONS

Office Action for counterpart JP Patent Application 2013-027474 dated Nov. 8, 2016; translation of the relevant part of the office action.

* cited by examiner

*Primary Examiner* — Ryan Lepisto
*Assistant Examiner* — Erin Chiem
(74) *Attorney, Agent, or Firm* — Kratz, Quintos & Hanson, LLP

(57) ABSTRACT

A spot-size converter includes a substrate, a first core provided over the substrate, and second and third cores provided over the substrate and over or under the first core with a cladding layer sandwiched therebetween and extending in parallel to the substrate and the first core.

10 Claims, 11 Drawing Sheets

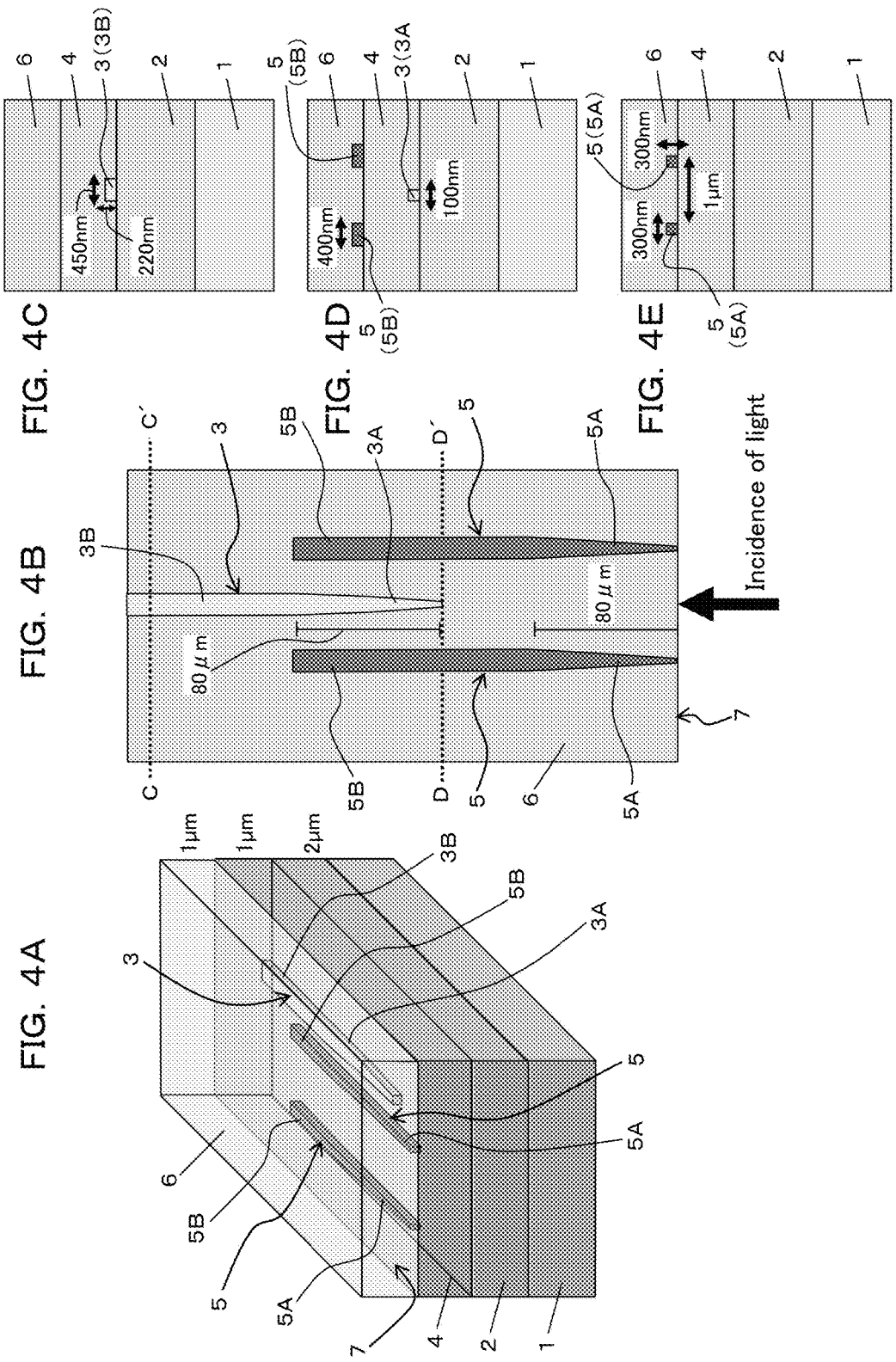

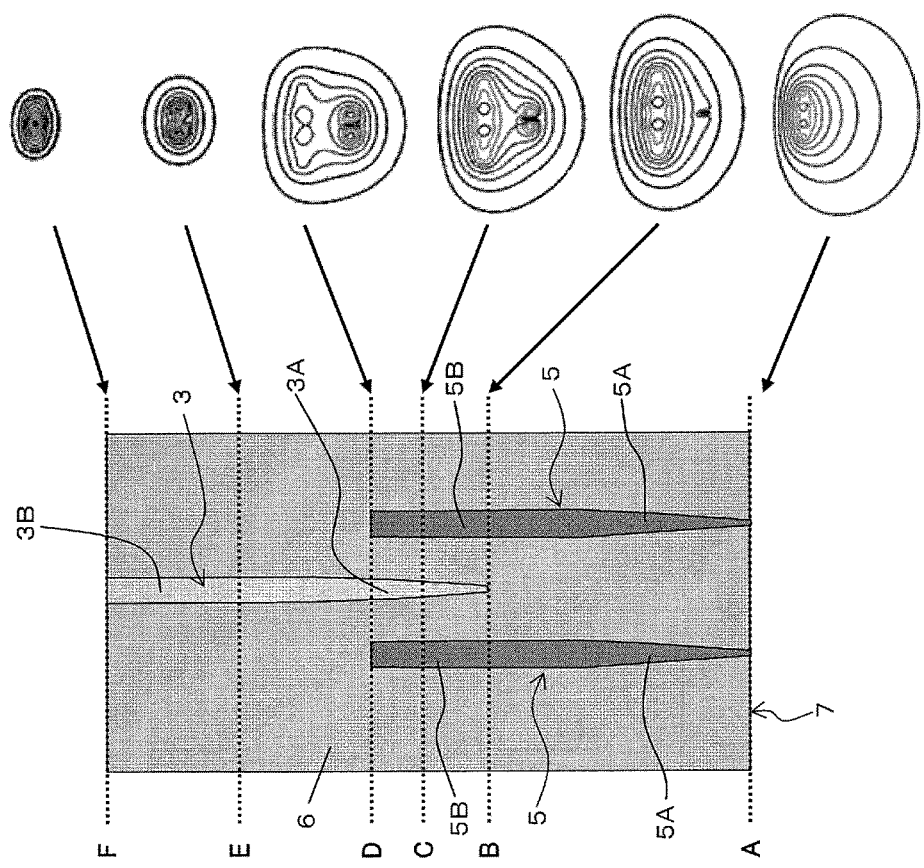

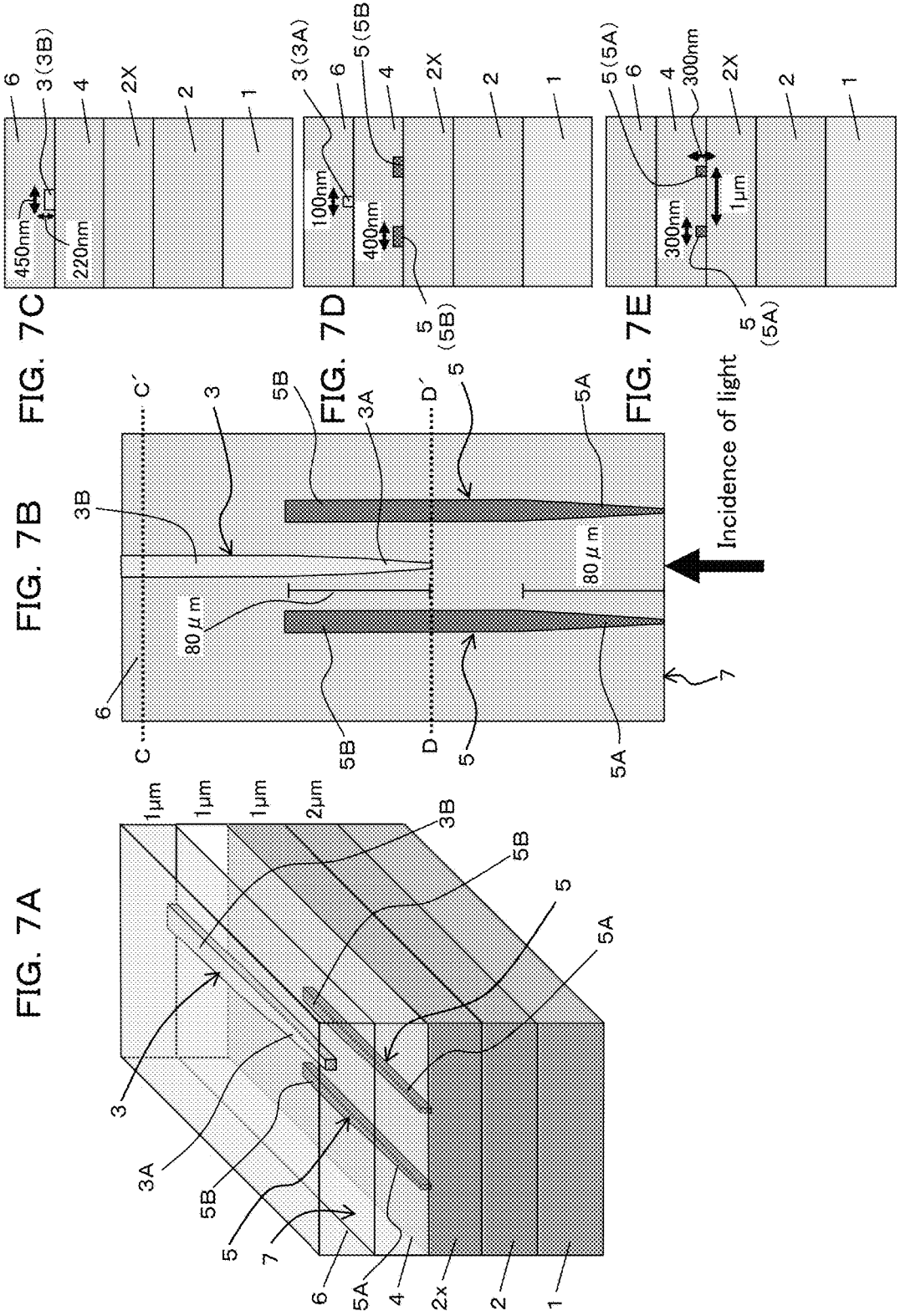

SPOT SIZE CONVERTER, LIGHT SOURCE, OPTICAL TRANSMITTER, OPTICAL RECEIVER AND OPTICAL TRANSMITTER-RECEIVER

CROSS-REFERENCE TO RELATED APPLICATION

This application is based upon and claims the benefit of priority of the prior Japanese Patent Application No. 2013-027474, filed on Feb. 15, 2013, the entire contents of which are incorporated herein by reference.

FIELD

The embodiments discussed herein are related to a spot size converter, a light source, an optical transmitter, an optical receiver and an optical transmitter-receiver.

BACKGROUND

While a demand for increase of the capacity and the speed of data processing is increasing, it is pointed out that a limit exists in the speeding up, power saving and downsizing in future computers/integrated circuits. In order to break down the limit, implementation of a device/system in which optical interconnections and electronic circuitry are integrated together is desired together with development of technical fields that use a new electronic phenomenon in semiconductors.

In such a situation as described above, attention gathers to Si photonics of producing an optical circuit on an SOI (Silicon on Insulator) substrate using a silicon (Si) microfabrication technology, and development of an optical interconnect technology characterized in speeding up, power saving and downsizing is performed actively.

Incidentally, since Si itself does not include a light emitting mechanism, in the optical interconnect technology that uses the Si photonics, it is investigated to input external light to an optical waveguide that configures an optical circuit on an SOI substrate.

However, a core of an optical waveguide by Si microfabrication has, as a size thereof, a width of, for example, approximately 450 nm in order to keep a single mode of propagation light, and a mismatch occurs with a spot size (for example, approximately several μm to 10 μm) of general external light. Therefore, high coupling loss occurs.

Thus, a technology is available wherein a mismatch with the spot size of external light is eliminated to reduce the coupling loss by providing a core with a taper portion having a core width that decreases toward an end face of the core to or from which light is inputted or outputted thereby to increase the spot size.

SUMMARY

According to an aspect of the embodiment, the spot-size converter includes a substrate; a first core provided over the substrate; and second and third cores provided over the substrate and over or under the first core with a cladding layer sandwiched therebetween and extending in parallel to the substrate and the first core.

According to an aspect of the embodiment, the light source includes a substrate; a spot-size converter provided on the substrate; and a light emitter provided on the substrate; the spot-size converter including a first core provided over the substrate; and second and third cores provided over the substrate and over or under the first core with a cladding layer sandwiched therebetween and extending in parallel to the substrate and the first core; the light emitter outputting light toward the spot-size converter.

According to an aspect of the embodiment, the optical transmitter includes a substrate; a spot-size converter provided on the substrate; a light emitter provided on the substrate; and an optical modulator provided on the substrate; the spot-size converter including a first core provided over the substrate; and second and third cores provided over the substrate and over or under the first core with a cladding layer sandwiched therebetween and extending in parallel to the substrate and the first core; the light emitter outputting light toward the spot-size converter; the optical modulator modulating light outputted from the spot-size converter.

According to an aspect of the embodiment, the optical receiver includes a substrate; a spot-size converter provided on the substrate; and an optical detector provided on the substrate; the spot-size converter including a first core provided over the substrate; and second and third cores provided over the substrate and over or under the first core with a cladding layer sandwiched therebetween and extending in parallel to the substrate and the first core; the optical detector detecting light outputted from the spot-size converter.

According to an aspect of the embodiment, the optical transmitter-receiver includes a substrate; first and second spot-size converters provided on the substrate; a light emitter provided on the substrate; an optical modulator provided on the substrate; and an optical detector provided on the substrate; the first spot-size converter including a first core provided over the substrate; and second and third cores provided over the substrate and over or under the first core with a cladding layer sandwiched therebetween and extending in parallel to the substrate and the first core; the second spot-size converter including a fifth core provided over the substrate; and sixth and seventh cores provided over the substrate and over or under the fifth core with a cladding layer sandwiched therebetween and extending in parallel to the substrate and the fifth core; the light emitter outputting light toward the first spot-size converter; the optical modulator modulating light outputted from the first spot-size converter; the optical detector detecting light outputted from the second spot-size converter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A to 1D are schematic views depicting a configuration of a spot size converter according to an embodiment, wherein FIG. 1A is a perspective view, FIG. 1B is a plan view, FIG. 1C is a sectional view taken along line C-C' of FIG. 1B, and FIG. 1D is a front elevational view, namely, a view depicting an end face denoted by reference numeral 7 in FIG. 1B;

FIGS. 4A to 4E are schematic views depicting a configuration and a size of the spot size converter according to the present embodiment, wherein FIG. 4A is a perspective view, FIG. 4B is a plan view, FIG. 4C is a sectional view taken along line C-C' of FIG. 4B, FIG. 4D is a sectional view taken along line D-D' of FIG. 4B, and FIG. 4E is a front elevational view, namely, a view depicting an end face denoted by reference numeral 7 in FIG. 4B.

FIG. 5 is a schematic plan view of the spot size converter according to the present embodiment and is a schematic view indicating a mode profile of light at several locations in contour lines.

FIGS. 7A to 7E are schematic views depicting a configuration and a size of another modification to the spot size converter according to the present embodiment, wherein FIG. 7A is a perspective view, FIG. 7B is a plan view, FIG. 7C is a sectional view taken along line C-C' of FIG. 7B, FIG. 7D is a sectional view taken along line D-D' of FIG. 7B, and FIG. 7E is a front elevational view, namely, a view depicting an end face denoted by reference numeral 7 in FIG. 7B.

DESCRIPTION OF EMBODIMENTS

Figure 1:
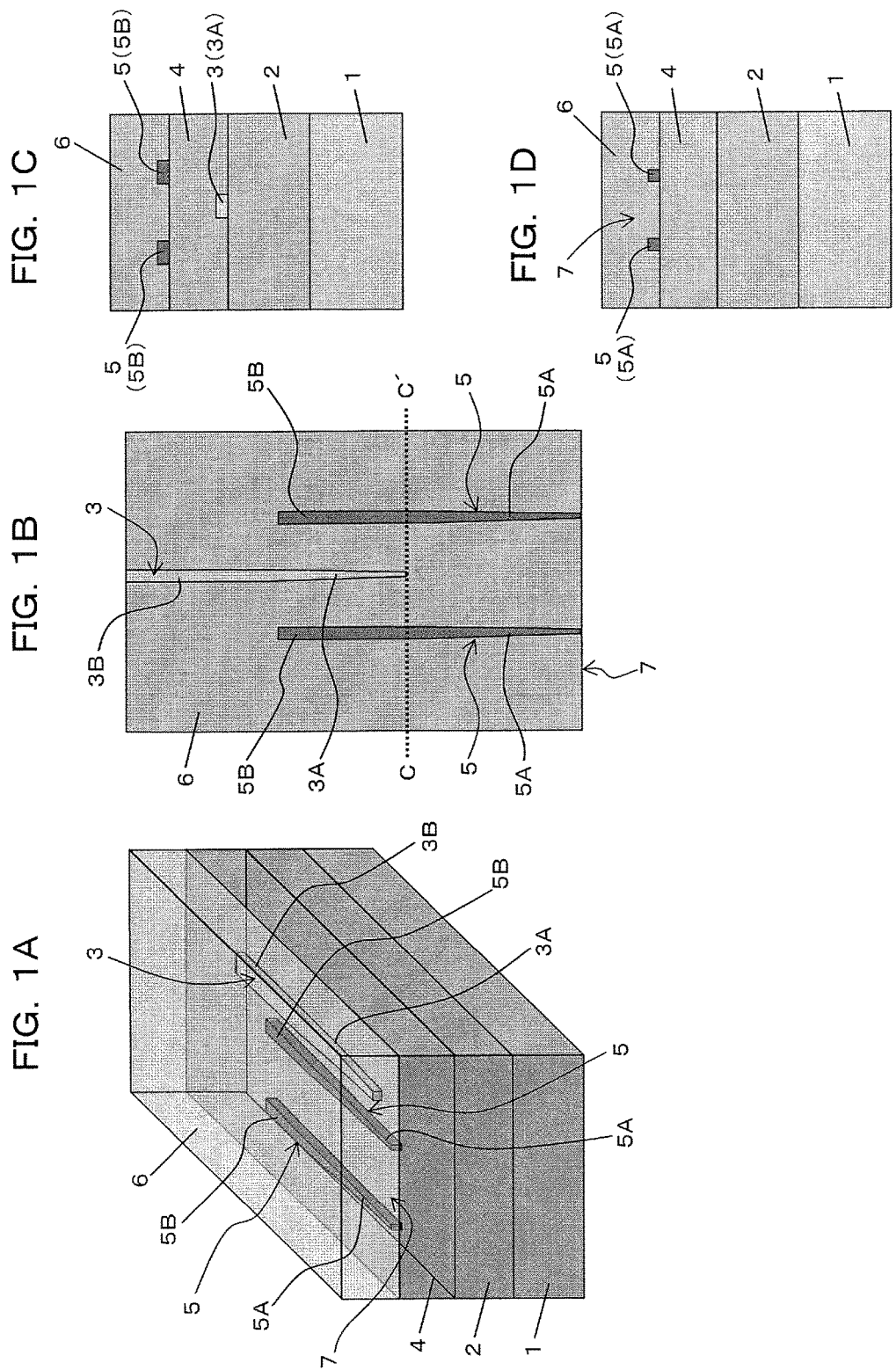

However, in the technology described over, in order to reduce the coupling loss, the core width is controlled with a high degree of accuracy, and if the core width is excessively great or excessively small, then the coupling loss increases drastically. Therefore, it is difficult to improve the manufacturing yield while the coupling loss is reduced.

Therefore, it is desired to improve the manufacturing yield while the coupling loss is reduced.

In the following, a spot-size converter, a light source, an optical transmitter, an optical receiver and an optical transmitter-receiver according to an embodiment of the present invention are described with reference to FIGS. 1A to 11 of the drawings.

The spot-size converter according to the present embodiment is used, for example, in an optical interconnect between boards, between chips or in a chip in which a semiconductor laser is used and also in various fields such as a field of optical fiber communications.

As depicted in FIGS. 1A to 1D, the present spot-size converter includes a substrate 1, a lower cladding layer 2, a lower core 3 provided on the lower cladding layer 2, an intermediate cladding layer 4 provided on the lower cladding layer 2 and the lower core 3, a plurality of upper cores 5 provided on the intermediate cladding layer 4, and an upper cladding layer 6 provided on the intermediate cladding layer 4 and the upper cores 5. It is to be noted that the following description is given of an example in which two upper cores 5 are provided as the plurality of upper cores 5.

It is to be noted that the lower core 3 is referred to also as first core. Meanwhile, the two upper cores 5 included in the plurality of upper cores 5 are referred to also as second core and third core. Further, the lower cladding layer 2 is referred to also as first cladding layer. Further, the intermediate cladding layer 4 is referred to also as second cladding layer. Furthermore, the upper cladding layer 6 is referred to also as third cladding layer.

Here, the substrate 1 is a silicon (Si) substrate. The lower cladding layer 2, intermediate cladding layer 4 and upper cladding layer 6 are $SiO_2$ cladding layers. The lower core 3 is a Si core. The upper cores 5 are SiN cores. In the present embodiment, an SOI substrate that includes a BOX (Buried Oxide) layer, which is a $SiO_2$ layer, and an SOI layer, which is a Si layer, on the substrate 1, and the SOI layer is etched such that the Si core as the lower core 3 is formed on the $SiO_2$ layer (BOX layer) as the lower cladding layer 2 from the SOI layer remaining as a result of the etching. Further, the $SiO_2$ layer (BOX layer) as the lower cladding layer 2 and the Si core as the lower core 3 are covered with the $SiO_2$ layer as the intermediate cladding layer 4, and the two SiN cores as the upper cores 5 are formed on the $SiO_2$ layer as the intermediate cladding layer 4 such that the Si core 3 is positioned between the SiN cores 5 as viewed from over. Further, the $SiO_2$ layer as the intermediate cladding layer 4 and the two SiN cores as the upper cores 5 are covered with the $SiO_2$ layer as the upper cladding layer 6. It is to be noted that SiN is lower in refractive index than Si and rather near to $SiO_2$. Therefore, an upper optical waveguide configured from the intermediate cladding layer 4, upper cores 5 and upper cladding layer 6 has a lower refractive index difference than that of a lower optical waveguide configured from the lower cladding layer 2, lower core 3 and intermediate cladding layer 4.

The Si core that is the lower core 3 is provided over the substrate 1 and is terminated at a position spaced away from an end face 7 to or from which light is inputted or outputted. The Si core as the lower core 3 includes, on the side of the end face 7, a taper region 3A having a sectional area that increases in a direction away from the end face 7 and a fixed sectional area region 3B contiguous to the opposite side of the taper region 3A to the end face 7 and having a fixed sectional area. It is to be noted that the taper region 3A is referred to also as first taper region. The fixed sectional area region 3B is referred to also as first fixed sectional area region. Here, the taper region 3A is a width taper region having a width increasing in a direction away from the end face 7. Meanwhile, the fixed sectional area region 3B is a region (fixed width region; fixed height (thickness) region) having a fixed width and having a fixed height (thickness). It is to be noted that, since the Si core 3 has a sectional area that first increases in a direction away from the end face 7 and then is fixed, the magnitude of the sectional area at the fixed sectional area region 3B is equal to the magnitude of the sectional area at the portion of the taper region 3A at which the sectional area is in the maximum.

It is to be noted that, when light is inputted to the end face 7, the light is outputted from the opposite side to the end face 7, but when light is to be outputted from the end face 7, the light is inputted from the opposite side to the end face 7. The end face 7 is referred to also as light incident face, light emitting face, light inputting face, light outputting face or light inputting/outputting face.

The two SiN cores 5 as the two upper cores are provided over the substrate 1 and also over the Si core 3 with the intermediate cladding layer 4 sandwiched therebetween. The two SiN cores 5 are positioned on the left and right sides of the Si core 3 and extend in parallel to each other from the end face 7 to a position corresponding to the taper region 3A of the Si core 3. Further, the two SiN cores 5 extend in parallel to the substrate 1 and the lower Si 3. Light that propagates in a region (optical waveguide) including the two SiN cores 5 forms a single optical mode (fundamental mode). In particular, the size of the two SiN cores 5 and the distance between the two SiN cores 5 are set such that light that propagates in the region including the two SiN cores 5 forms a single optical mode and the spot size of the light coincides or substantially coincides with the spot size of inputted or outputted light. It is to be noted that, where three or more SiN cores 5 are provided, they may be provided such that, between the two upper cores 5 that are positioned on the opposite left and right sides of the Si core 3, the remaining SiN core or cores 5 are provided.

Preferably, the two SiN cores 5 include, on the end face 7 side, a taper region 5A having a sectional area that increases in a direction away from the end face 7 and a fixed sectional area region 5B contiguous to the opposite side of the taper region 5A to the end face 7 side and having a fixed sectional area. It is to be noted that the taper region 5A is referred to also as second taper region. Further, the fixed sectional area region 5B is referred to also as second fixed sectional area region. Here, the taper region 5A is a width taper region having a width that increases in a direction away from the end face 7. Further, the fixed sectional area region 5B is a region (fixed width region; fixed height (thickness) region) having a fixed width and a fixed height (thickness). It is to be noted that, since each SiN core 5 has a sectional area that first increases in the direction away from the end face 7 and then is fixed, the magnitude of the sectional area of the fixed sectional area region 5B is equal to the magnitude of the sectional area of the portion of the taper region 5A at which the sectional area of the taper region 5A is in the maximum.

Here, the two SiN cores 5 extend to the opposite side of the taper region 3A of the Si core 3 to the end face 7, namely, to a position corresponding to the boundary position between the taper region 3A and the fixed sectional area region 3B. Meanwhile, the taper region 3A of the Si core 3 extends in the direction away from the end face 7 from a position corresponding to the fixed sectional area region 5B of the SiN cores 5. It is to be noted that the two SiN cores 5 may otherwise extend farther than the position corresponding to the boundary position between the taper region 3A and the fixed sectional area region 3B of the Si core 3 such that a terminating portion thereof is positioned in a region corresponding to the fixed sectional area region 3B of the Si core 3.

In this manner, the width of the two SiN cores 5 is narrowest at the end face 7 (input end) to which light is inputted from the outside, gradually and moderately increases in a tapering manner toward a propagation direction of light (waveguide direction of light) to the widest location and then is fixed. The two SiN cores 5 are formed partway and terminated. Meanwhile, the Si core 3 is structured such that the width thereof is smallest at an end (terminal end) thereof at a position corresponding to the region in which the width of the two SiN cores 5 is greatest, gradually increases in a tapering manner toward the propagation direction of light until it becomes greatest at the location at which the two SiN cores 5 are terminated, and then is fixed.

Further, the first core (here, the Si core 3) has a first portion (here, the taper region 3A) opposed to the second core and the third core (here, the two SiN cores 5) and a second portion (here, the fixed sectional area region 3B) contiguous to the first portion. Further, the second and third cores individually have a third portion (here, the fixed sectional area region 5B) opposed to the first core, and a fourth portion (here, the taper region 5A) continuous to the opposite side of the third portion to the side on which the second portion is provided. A cross section of the first portion perpendicular to the direction in which the first portion extends increases in size toward the second portion. Further, the fourth portions of the second and third cores extend to an end face of the substrate 1. Further, the shape of the second core, the shape of the third core and the distance between the second and third cores are determined such that light may couple to a region including the second and third cores. Further, the first, second and third cores are provided such that light is coupled from the second and third cores to the first core. Across section of the fourth portions of the second and third cores perpendicular to the direction in which the fourth portions extend increases in size toward the third portion. It is to be noted that, while description here is given taking a case in which the second and third cores are provided as an example, a fourth core may be provided additionally which is disposed over or under the substrate and the first core with a cladding layer sandwiched therebetween and extends in parallel to the substrate and the first core. In this instance, the second, third and fourth cores may individually have a third portion opposed to the first portion and a fourth portion contiguous to the opposite side of the third position to the side on which the second portion is provided. Further, the fourth core may be provided, for example, on the same side as the second and third cores to the substrate and the first core such that the distance between the fourth core and the substrate is set, for example, equal to the distance between the second and third cores and the substrate.

The spot size converter configured in such a manner as described over convers the spot size in the following manner.

It is to be noted that description here is given taking a case in which the end face 7 serves as an input face (incidence face), namely, the end faces of the two SiN cores 5 serve as an input end (incidence end) and light having a large spot size from a light source such as, for example, a semiconductor laser is inputted from the outside to the input end and the light is outputted from the opposite side to the end face 7.

Figure 2:
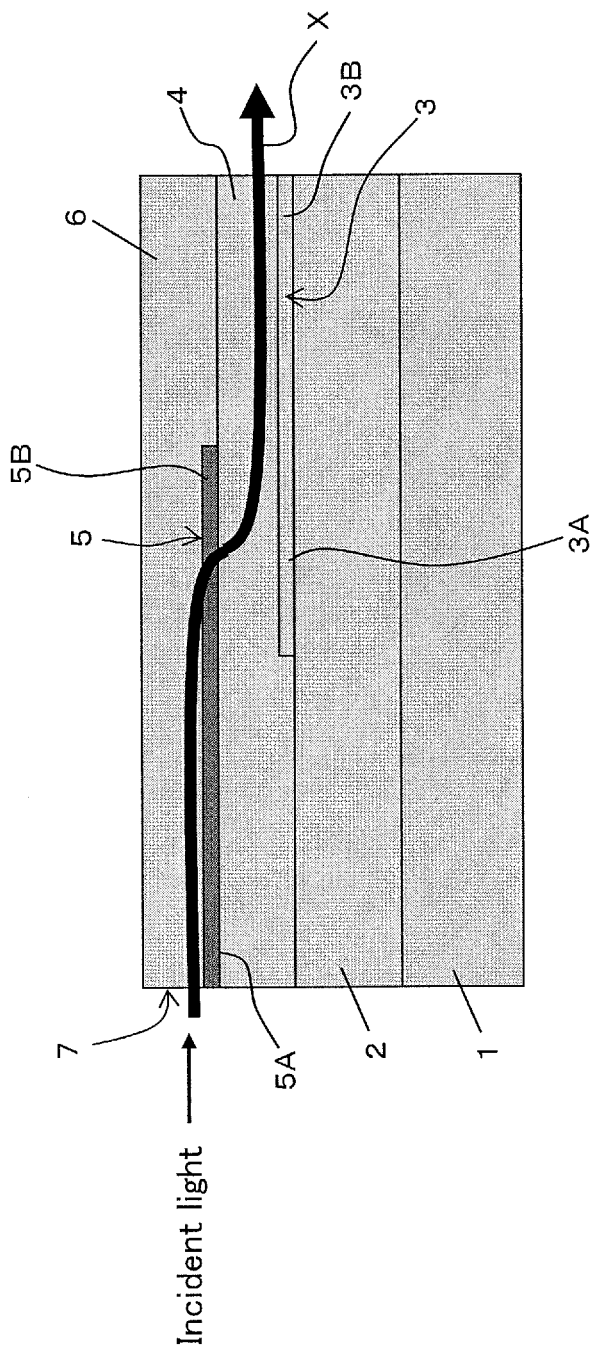
FIG. 2 is a schematic sectional view of the spot size converter according to the present embodiment taken along a propagation direction of light and illustrating operation of the spot size converter.

First, light (incident light) from a light source having a large spot size such as, for example, a semiconductor laser is inputted to the end face of the two SiN cores 5 as depicted in FIG. 2.

Then, when the propagation light enters a region in which a region (waveguide) including the two SiN cores 5 and another region (waveguide) including the taper region 3A of the Si core 3 overlap with each other, it is influenced by the Si core 3 provided under the two SiN cores 5 with the intermediate cladding layer 4 sandwiched therebetween, namely, by the Si core 3 positioned downwardly by a distance equal to the thickness of the cladding layer 4 of one layer. Consequently, the light intensity of the propagation light gradually couples adiabatically from the two SiN cores 5 to the Si core 3. In particular, the light propagating in the region including the two SiN cores 5 gradually transfers, in the overlapping region, to the region (waveguide) including the Si core 3 as indicated by an arrow mark X in FIG. 2. Thereupon, as the sectional area of the taper region 3A of the Si core 3 increases, the propagation light is confined in an increasing strength in the Si core 3. In particular, since the taper region 3A of the Si core 3 is provided in the overlapping region, it is possible to confine the propagation light with certainty in the Si core 3. Then, the propagation light propagates as light of a single mode in the fixed sectional area region 3B of the Si core 3. Here, in order to keep the single mode of the propagation light, as a size of the Si core 3, it has a width of, for example, approximately 450 nm. In this instance, the spot size of the light to be outputted from the opposite side to the end face 7 decreases in response to the dimension of the Si core 3.

In this manner, the present spot size converter can convert light of a large spot size into light of a small spot size. In other words, when light propagates in the region including the two SiN cores 5 and the region including the Si core 3, the spot size of the propagation light can be converted.

Here, the size of the two SiN cores 5 and the distance between the two SiN cores 5 are set such that propagation light forms a single optical mode and besides the spot size coincides or substantially coincides with the spot size of inputted light (for example, several µm to approximately 10 µm) as described hereinabove. For example, where the spot size of the inputted light is approximately 3 µm, in order to adjust the spot size to the size, the distance between the two SiN cores 5 (distance between the centers of the two SiN cores 5) may be set to approximately 1 µm. Further, the dimensions of the two SiN cores 5 on the end face 7 to which external light is inputted may be set such that the width is approximately 300 nm and the height (thickness) is approximately 300 nm so that propagation light propagating in the region including the two SiN cores 5 forms a single optical mode. By the configuration, light can be inputted to the region including the two SiN cores 5 with low coupling loss without causing a mismatch in spot size. Further, light inputted to the region including the two SiN cores 5 propagates as light of a single mode in the region including the two SiN cores 5. It is to be noted that, if the distance between the two SiN cores 5 is approximately 1 µm, then the propagation light propagating in the region including the two SiN cores 5 forms a single optical mode. Here, since the spot size depends upon the distance between the two SiN cores 5, the distance between the two SiN cores 5 may be set in response to the spot size of inputted light. In this instance, if the distance between the two SiN cores 5 is excessively great, then two waveguides independent of each other are formed in the region including the two SiN cores 5, and consequently, the propagation light propagating in the region including the two SiN cores 5 fails to form a single optical mode. Further, the size of the two SiN cores 5 may be set so that light is confined by the two SiN cores 5 and propagation light propagating in the region including the two SiN cores 5 forms a single optical mode. In this instance, if the size of the two SiN cores 5 are excessively great, then the propagation light propagating in the region including the two SiN cores 5 fails to form a single optical mode.

In this manner, the manufacturing tolerance in accuracy of the core width at the end face 7 to which external light is inputted can be increased by using the two SiN cores 5 spaced from each other in the horizontal direction in this manner. In particular, where the two SiN cores 5 are used, the spot size can be controlled by the distance between the two SiN cores 5. In this instance, the influence of the working accuracy of the core width of the SiN cores 5 on the coupling loss is smaller than the influence of the working accuracy of the distance between the SiN cores 5 on the coupling loss. Therefore, even if a manufacturing error occurs with the core width of the two SiN cores 5, the influence of this on the mode shape formed by the two SiN cores 5 as a whole, namely, on the spot size that depends upon the distance between the two SiN cores 5, is low. The SiN cores 5 are obtained by forming a SiN film, for example, by plasma CVD and then working this SiN film by EB lithography. The working accuracy by the EB lithography is approximately ±10 nm. For example, where the distance between the two SiN cores 5 is approximately 1 µm as described hereinabove, the manufacturing error of approximately ±10 nm is small in comparison with the distance of approximately 1 µm. Further, even if some manufacturing error occurs with the size of the SiN cores 5 having the width and the height of approximately 300 nm, the influence of this on the spot size that depends upon the distance between the two SiN cores 5 is small. Accordingly, it is possible to increase the manufacturing tolerance in accuracy of the core width at the end face 7 to which external light is inputted while the spot size is adjusted to the spot size of inputted light. In other words, the manufacturing yield can be improved while the coupling loss is reduced.

Further, since the two SiN cores 5 are provided over the Si core 3 with the intermediate cladding layer 4 sandwiched therebetween as described hereinabove, the position of the input end to which external light is inputted can be set to a high position and can be spaced away from the Si substrate 1 in comparison with that in an alternative case in which external light is inputted directly to the Si core 3. Consequently, leakage of light to the Si substrate 1 can be suppressed and the radiation loss can be suppressed. Therefore, even if the spot size of light inputted from the outside is, for example, approximately 3 µm, if the thickness of the intermediate cladding layer 4 is set to approximately 1 µm, then it is possible to use an SOI substrate of a thin BOX layer of approximately 2 µm, and even if such an SOI substrate is used, sufficiently low coupling loss can be achieved and reduction of the manufacturing cost can be anticipated. In particular, generally the thickness of the lower cladding layer under the Si core is set to a thickness substantially equal to the spot size of light inputted from the outside taking the leakage of light to the Si substrate, which makes a cause of radiation loss, into consideration. Further, a BOX layer of an SOI substrate is frequently used for the lower cladding layer under the Si core. For example, in the case where the spot size of light inputted from the outside is approximately 3 µm, in order to suppress the radiation loss by the leakage of light to the Si substrate, an SOI substrate having a BOX layer of approximately 3 µm has been used in order to set the thickness of the BOX layer to approximately 3 µm. However, as the thickness of the BOX layer increases, the manufacturing cost of the SOI substrate increases. In this case, if the configuration described over is used, then even if the spot size of light inputted from the outside is approximately 3 µm, if the thickness of the intermediate cladding layer 4 is set to approximately 1 µm, then it is possible to use an SOI substrate having a thin BOX layer of approximately 2 µm. Consequently, the manufacturing cost can be reduced while the radiation loss is suppressed.

It is to be note that the Si core 3 is formed by working the Si layer on the surface of the SOI substrate, for example, by EB lithography. Here, the working accuracy by the EB lithography is approximately ±10 nm. The SiO$_2$ layers as the intermediate cladding layer 4 and the upper cladding layer 6 are formed, for example, by plasma CVD. The SiN cores 5 are formed, for example, EB lithography after film formation by plasma CVD. Here, the working accuracy by the EB lithography is approximately ±10 nm.

In this manner, it is possible to improve the manufacturing yield and reduce the cost while the coupling loss of light is reduced by the spot size converter configured in such a manner as described over. Consequently, a spot-size converter with which inputting and outputting to and from the Si core of the optical waveguide (optical circuit) by fine Si working can be implemented with low coupling loss and at a low cost.

Figure 3:
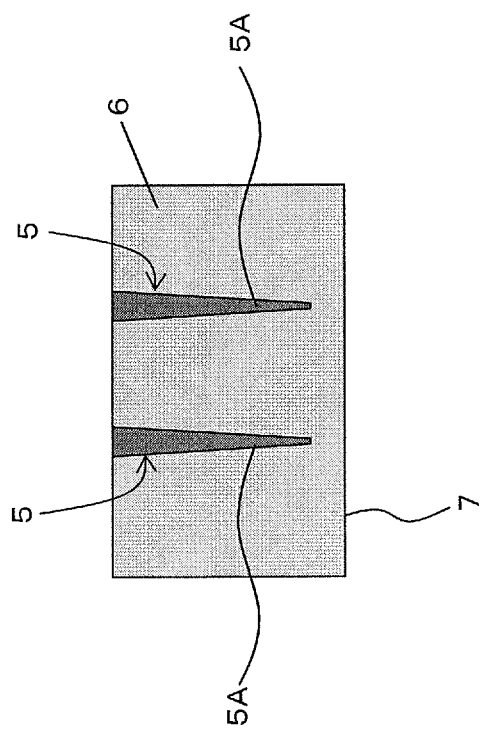
FIG. 3 is a schematic plan view depicting a configuration of a modification to the spot size converter according to the present embodiment.

It is to be noted that, while the two SiN cores 5 here extend to the end face 7, the present invention is not limited to this, and, for example, the two SiN cores 5 may be terminated in the proximity of the end face 7 as depicted in FIG. 3.

In particular, the size of the spot-size converter configured in such a manner as described over may be set in the following manner.

An SOI substrate including a BOX layer (SiO$_2$ layer) of a thickness of approximately 2 μm and an SOI layer (Si layer) of a thickness of approximately 220 nm is formed on the Si substrate 1 as depicted in FIGS. 4A to 4E. Therefore, the thickness of the SiO$_2$ layer as the lower cladding layer 2 is approximately 2 μm, and the thickness of the Si core as the lower core 3 is approximately 220 nm. Further, the Si core as the lower core 3 has the taper region 3A having a minimum width of approximately 100 nm at a terminal end (tip end) thereof, a maximum width of approximately 450 nm and a length of approximately 80 μm, and the fixed sectional area region 3B having a width of approximately 450 nm (refer particularly to FIGS. 4D and 4C). Meanwhile, the SiO$_2$ layer as the intermediate cladding layer 4 has a thickness of approximately 1 μm. Further, in both of the two SiN cores 5, the dimensions of the sectional area at the end face 7 to which light from the outside is inputted (end face area at the input end), namely, both of the height (thickness) and the width of the sectional area, are approximately 300 nm, and the distance between the two SiN cores 5 is approximately 1 μm [refer particularly to FIG. 4E]. Both of the two SiN cores 5 have the taper region 5A having a minimum width of approximately 300 nm at the input end thereof, a maximum width of approximately 400 nm and a length of approximately 80 μm, and the fixed sectional area region 5B having a width of approximately 400 nm [refer particularly to FIGS. 4E and 4D]. It is to be noted that the two SiN cores 5 have a height (thickness) fixed over the overall length thereof and have a height (thickness) of approximately 300 nm. Further, the SiO$_2$ layer as the upper cladding layer 6 has a thickness of approximately 1 μm.

In the spot-size converter configured in such a manner as described over and having such dimensions as indicated hereinabove, light inputted from the outside propagates (is guided) along the region including the two SiN cores 5 and then propagates (is guided) to the region including the Si core while the mode shape gradually changes moderately.

Here, FIG. 5 is a schematic view depicting the mode profile of light at different locations of such a spot-size converter as described over in the form of contour lines. It is to be noted that, in the optical mode profile of FIG. 5, the light intensity is higher on an inner side contour line than on an outer side contour line.

In FIG. 5, the profile of inputted light is converted into a profile of a bimodal shape in a range from a location indicated by reference character A to another location indicated by reference character B, namely, from the end face 7 to which light, which the spot size is large, from the outside is inputted to a position corresponding to the tip end (terminal end) position of the Si core 3. Then, the light gradually optically couples from the two SiN cores 5 to the Si core 3 within the region from a location indicated by reference character B to a location indicated by reference character D through a location indicated by reference character C, namely, within the region within which the region including the two SiN cores 5 and the region including the Si core 3 overlap with each other (within the region within which the region including the fixed sectional area region 5B of the two SiN cores 5 and the region including the taper region 3A of the Si core 3 overlap with each other). Thereafter, the light is confined in and propagates along the Si core 3 within the region from a location indicated by reference character D to a location indicated by reference character F through a location indicated by reference character E, namely, within the region including the fixed sectional area region 3B of the Si core 3, whereupon the spot size becomes smaller.

It is to be noted that, where the optical mode profile has contour lines that exhibit a plurality of peaks and have contour lines provided in such a manner as to surround the peaks like an optical mode profile at the location indicated by reference character A in FIG. 5, light that propagates in the region including the two SiN cores 5 forms a single optical mode. In other words, light that propagates in the region including the two SiN cores 5 forms a single optical mode having an intensity peak between the SiN cores 5. Further, if the optical mode profile has contour lines that exhibit a plurality of peaks and have contour lines provided in such a manner as to surround the peaks like an optical mode profiles at locations indicated by reference characters B, C and D in FIG. 5, then light that propagates in the region including the two SiN cores 5 and the Si core 3 forms a single optical mode. Further, where the optical mode profile has contour lines that exhibit a plurality of peaks and has contour lines provided in such a manner as to surround the peaks like an optical mode profile at a location indicated by reference character E in FIG. 5, light that propagates in the region including the Si core 3 forms a single optical mode.

Incidentally, in the present spot size converter, optical discontinuity occurs at the location denoted by reference character B and the location denoted by reference character D in FIG. 5.

Figure 6B:
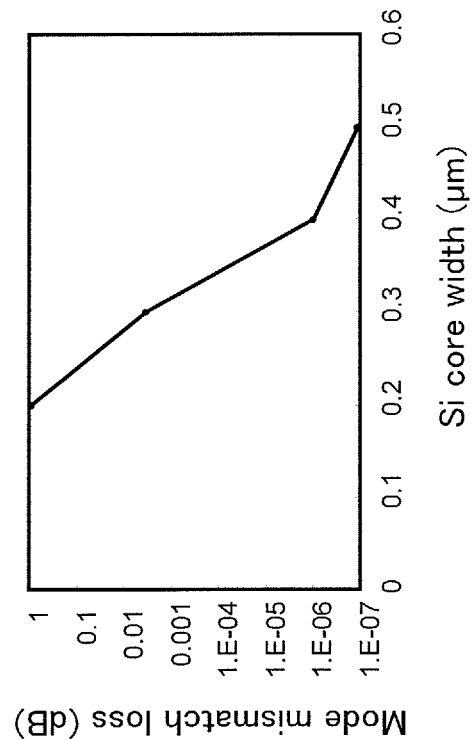
FIG. 6B is a view illustrating a simulation result of excessive loss by a mode mismatch at another location denoted by reference character D in FIG. 5.
Figure 6A:
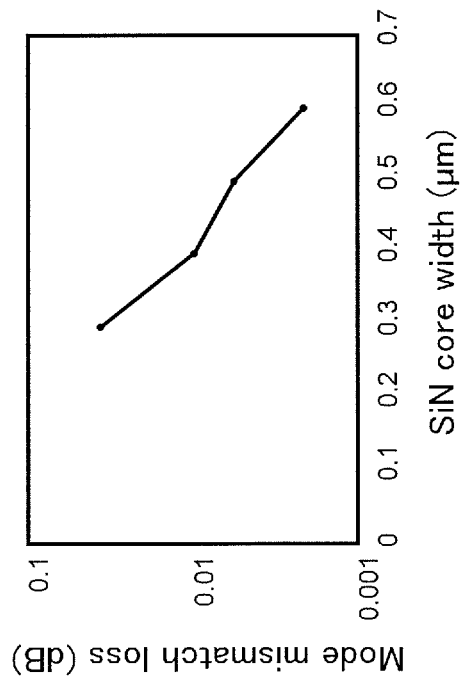
FIG. 6A is a view illustrating a simulation result of excessive loss by a mode mismatch at a place denoted by reference character B in FIG. 5.

Here, FIG. 6A illustrates a result of a simulation of excessive loss by a mode mismatch at the location denoted by reference character B in FIG. 5.

If the width of the Si core 3 at the location denoted by reference character B in FIG. 5 is approximately 100 nm, then the excessive loss by a mode mismatch can be suppressed to approximately 0.01 dB or less by setting the width of each of the two SiN cores 5 to approximately 400 nm or more as depicted in FIG. 6A.

Meanwhile, FIG. 6B similarly illustrates a result of a simulation of excessive loss by a mode mismatch at the location denoted by reference character D in FIG. 5.

If the width of each of the two SiN cores 5 at the location denoted by reference character D is approximately 400 nm, then the excessive loss by a mode mismatch can be suppressed to approximately 0.01 dB or less by setting the width of the Si core 3 to approximately 300 nm or more as indicated in FIG. 6B.

Accordingly, in the present spot size converter, the width of the Si core 3 at the location denoted by reference character B in FIG. 5 is set to approximately 100 nm and the width of the SiN cores 5 is set to approximately 400 nm or more while the width of the two SiN cores 5 at the location denoted by reference character D in FIG. 5 is set to approximately 400 nm and the width of the Si core 3 is set to approximately 300 nm or more. By such setting, the excessive loss of the entire spot size converter upon mode conversion can be suppressed to approximately 0.02 dB or less.

Therefore, in the present spot size converter, the width of the Si core 3 at the location denoted by reference character B in FIG. 5 is set to approximately 100 nm and the width of the two SiN cores 5 is set to approximately 400 nm while the width of the two SiN cores 5 at the location denoted by reference character D in FIG. 5 is set to approximately 400 nm and the width of the Si core 3 is set to approximately 450 nm as described hereinabove. By such setting, the excessive loss of the entire spot size converter upon mode conversion can be suppressed to approximately 0.02 dB or less.

Accordingly, with the spot size converter according to the present embodiment, there is an advantage that, while the coupling loss is reduced, the manufacturing yield can be improved.

It is to be noted that the present invention is not limited to the configuration of the embodiment described hereinabove, but the embodiment can be modified in various manners without departing from the spirit and scope of the present invention.

For example, while the two SiN cores 5 in the embodiment described over includes the taper region 5A, the present invention is limited to this, but they may include no taper region and have a cross sectional area that is fixed over the overall length thereof. However, where the taper region 5A that has a width that is smallest at the end face 7 to which light from the outside is inputted and increases as the distance from the end face 7 increases is provided on the two SiN cores 5 as in the embodiment described over, the mode of light inputted from the end face 7 can be made a single mode with certainty.

Further, while the two SiN cores 5 in the embodiment described hereinabove has the fixed sectional area region 5B on the opposite side to the side of the end face 7 to which light from the outside is inputted such that the fixed sectional area region 5B is terminated, the present invention is not limited to this. A taper region in which the sectional area decreases toward the opposite side to the side of the end face 7 may be provided such that it is contiguous to the opposite side of the fixed sectional area region 5B to the side of the end face 7. In other words, the two SiN cores 5 may individually include taper regions on opposite sides of the direction (longitudinal direction) away from the end face 7 across the fixed sectional area region.

Further, in the embodiment described hereinabove, the SiN cores 5 as the plurality of (here, two) upper cores are provided across the cladding layer 4 over the Si core 3 as one lower core. However, for example, the Si core 3 as one upper core may be provided over the SiN cores 5 as the plurality of (here, two) lower cores with the cladding layer 4 sandwiched therebetween as depicted in FIGS. 7A to 7E. In other words, while, in the embodiment described hereinabove, the one Si core 3 is provided under the plurality of (here, two) SiN cores 5 with the intermediate cladding layer 4 sandwiched therebetween, the present invention is not limited to this, but the one Si core 3 may be provided over the plurality of (here, two) SiN cores 5 with the cladding layer 4 sandwiched therebetween. In this instance, an SOI substrate including a BOX layer in the form of a $SiO_2$ layer and an SOI layer in the form of a Si layer on the Si substrate 1 is used, and a $SiO_2$ layer as a lower cladding layer 2X of the second layer is provided on the $SiO_2$ layer (BOX layer) as the lower cladding layer 2. Then, the two SiN cores 5 as the lower cores are formed on the $SiO_2$ layer as the lower cladding layer 2X of the second layer, and the $SiO_2$ layer as the lower cladding layer 2X of the second layer and the two SiN cores 5 as the lower cores are covered with the $SiO_2$ layer as the intermediate cladding layer 4. Then, on the $SiO_2$ layer as the intermediate cladding layer 4, the Si core 3 as the upper core is formed such that the Si core 3 is positioned between the two SiN cores 5 as viewed from over. Then, the $SiO_2$ layer as the intermediate cladding layer 4 and the Si core 3 as the upper core may be covered with a $SiO_2$ layer as the upper cladding layer 6. In this instance, the spot size converter includes a substrate, a lower cladding layer, a plurality of lower cores provided on the lower cladding layer, an intermediate cladding layer provided on the lower cladding layer and the lower cores, an upper core provided on the intermediate cladding layer, and an upper cladding layer provided on the intermediate cladding layer and the upper core. Consequently, it is possible to couple light from the outside with low loss to the optical waveguide including the Si core 3 as the upper core provided over the input end to which light from the outside is inputted (input end of the two SiN cores 5 as the lower cores). It is to be noted that the configuration of the other part, other dimensions and so forth may be similar to those in the embodiment described hereinabove.

Further, while the two SiN cores 5 in the embodiment and the modifications described over are positioned on opposite sides with respect to the Si core 3, the present invention is not limited to this, but one of the two SiN cores 5 may be positioned just over or just under the Si core 3. In particular, as viewed from over, the Si core 3 may be sandwiched between the two SiN cores 5 or one of the SiN cores 5 may be positioned just over or just under the Si core 3 while the other SiN core 5 is positioned in a spaced relationship from the one SiN core 5 in the horizontal direction (leftward and rightward direction).

Further, while the region including the two SiN cores 5 and the region including the Si core 3 in the embodiment and the modifications described over overlap with each other, the present invention is not limited to this, but the region including the two SiN cores 5 and the region including the Si core 3 may be displaced from each other along the light propagation direction such that the region including the two SiN cores 5 and the region including the Si core 3 may not overlap with each other so that light may propagate from the region including the two SiN cores 5 to the region including the Si core 3.

Figure 8:
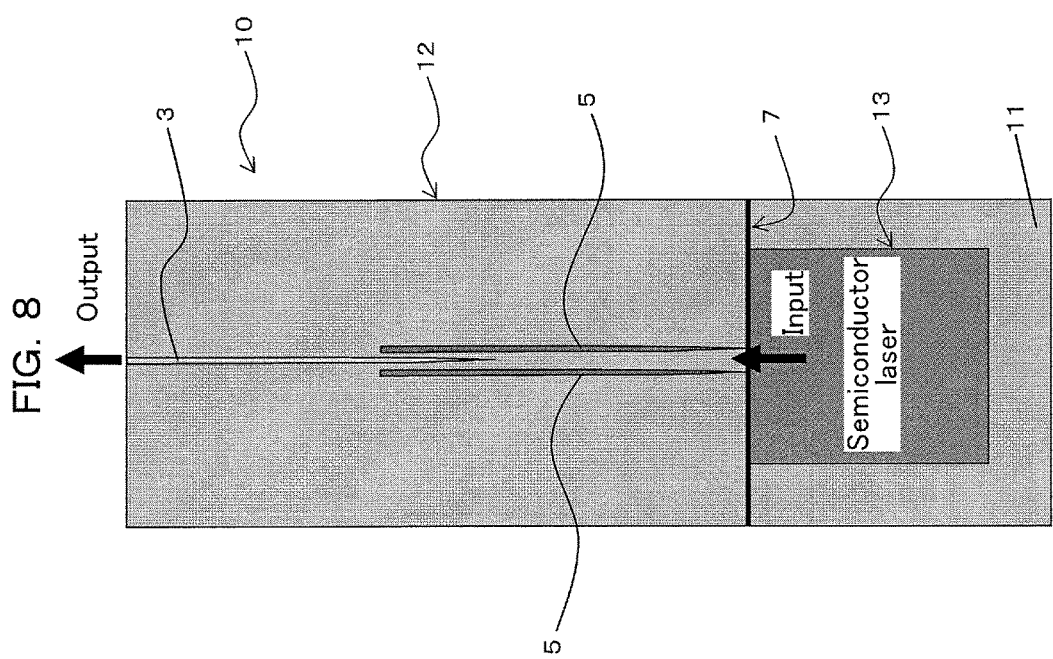
FIG. 8 is a schematic plan view depicting a light source in which the spot size converter according to the present embodiment is used.

Incidentally, also it is possible to use the spot size converter of any of the embodiment and the modifications described over to configure such a light source 10 as depicted in FIG. 8. In this instance, the light source 10 may include a substrate 11, a spot size converter 12 provided on the substrate 11 and configured in such a manner as in any of the embodiment and the modifications described over, and a light emitter 13 provided on the substrate 11, and the light emitter 13 may output light toward the end face 7 of the spot size converter 12. Here, the light emitter 13 may be configured, for example, using a semiconductor laser. For example, the light source (hybrid integrated light source) 10 can be implemented by mounting, on an SOI substrate, the spot size converter 12 configured in such a manner as in any of the embodiment and the modifications described over and the light emitter 13 that outputs light toward the end face 7 of the spot size converter 12. In such a light source 10 as just described, light outputted from the light emitter 13 is inputted from the end face 7 of the spot size converter 12, and the spot size thereof is converted by the spot size converter 12 when the light propagates in the region including the plurality of (here, two) SiN cores 5 and the region including the Si core 3. Then, the light propagates in the region (waveguide) including the Si core 3 and is outputted from the opposite side to the end face 7. with such a light source 10 as just described, it is possible to convert the spot size of light to be outputted from the light emitter 13 into a small size and output the light of the converted spot size while the coupling loss of light is suppressed. Since such a light source 10 as described over includes the spot size converter 12 configured in such a manner as in any of the embodiment and the modifications described over, it is advantageous in that the manufacturing yield can be improved while the coupling loss is reduced. It is to be noted that the light source 10 here is configured such that it includes one light emitter 13 and one spot size converter 12, the present invention is not limited to this, but the light source 10 may be configured otherwise such that, for example, it includes a plurality of light emitters 13 and a plurality of spot size converters 12. In this case, the plurality of light emitters 13 may be juxtaposed in parallel and besides the plurality of spot size converters 12 may be juxtaposed in parallel. This makes it possible to simultaneously convert the spot size of a plurality of light beams outputted from the light emitters 13 and output the light beams of the converted spot size.

Figure 9:
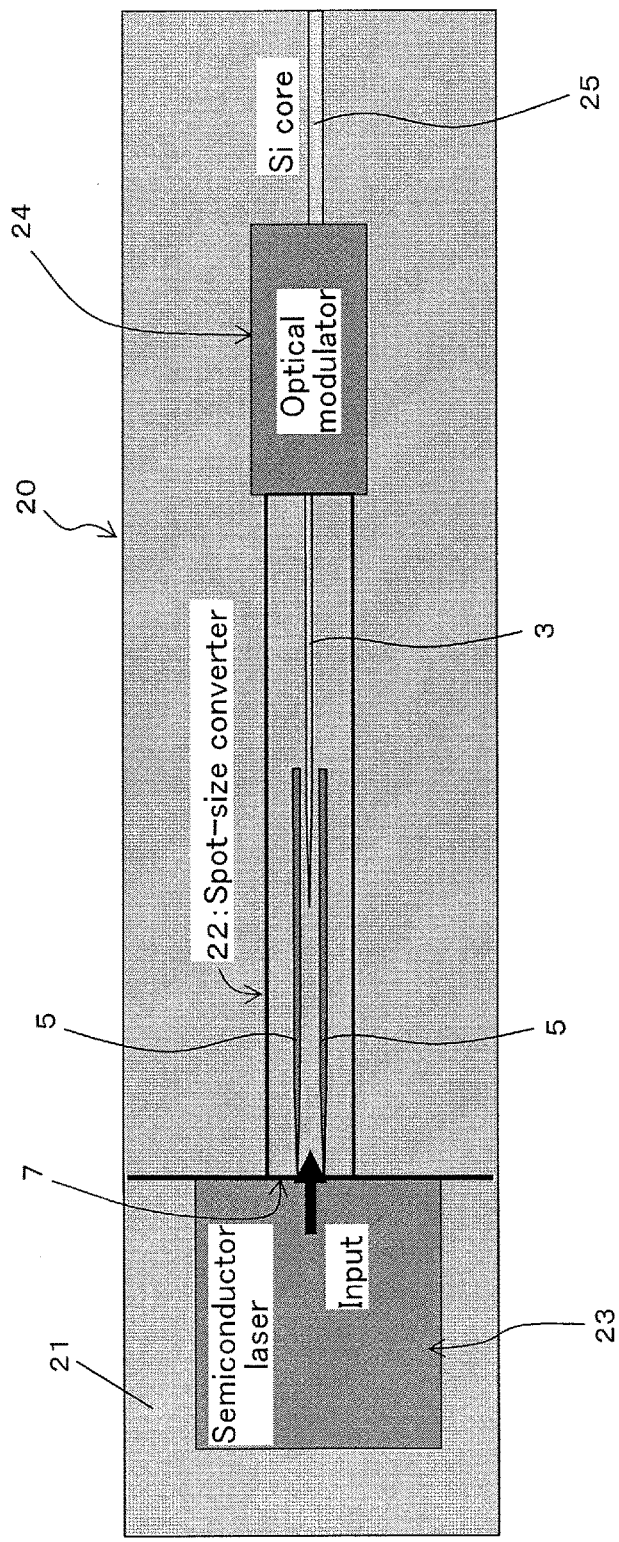
FIG. 9 is a schematic plan view depicting an optical transmitter in which the spot size converter according to the present embodiment is used.

Also it is possible to use the spot size converter of any of the embodiment and the modifications described over to configure such an optical transmitter 20 as depicted in FIG. 9. In this instance, the optical transmitter 20 includes a substrate 21, a spot size converter 22 provided on the substrate 21 and configured in such a manner as in any of the embodiment and the modifications described over, a light emitter 23 provided on the substrate 21, and an optical modulator 24 provided on the substrate 21, and the light emitter 23 may output light toward the end face 7 of the spot size converter 22 while the optical modulator 24 modulates the light outputted from the opposite side to the side of the end face 7 of the spot size converter 22. Here, the light emitter 23 may be configured using, for example, a semiconductor laser. Meanwhile, the optical modulator 24 may be configured using, for example, a Mach-Zehnder type optical modulator. The optical transmitter 20 can be implemented, for example, by mounting, on an SOI substrate, the spot size converter 22 configured in such a manner as in any of the embodiment and the modifications described over, the light emitter 23 that outputs light toward the end face 7 of the spot size converter 22, and the optical modulator 24 that modulates the light outputted from the opposite side to the end face 7 of the spot size converter 22. In such an optical transmitter 20 as just described, light outputted from the light emitter 23 is inputted from the end face 7 of the spot size converter 22, and the spot size thereof is converted by the spot size converter 22 when the light propagates in the region including the plurality of (here, two) SiN cores 5 and the region including the Si core 3. Then, the light propagates in the region (waveguide) including the Si core 3 and is outputted from the opposite side to the end face 7. Then, the light outputted from the opposite side to the end face 7 of the spot size converter 22 is inputted to the optical modulator 24 and modulated by the optical modulator 24, and the modulated signal is outputted to a Si core 25 provided on the output side of the optical modulator 24. Such an optical transmitter 20 as just described is advantageous in that, since it includes the spot size converter 22 of any of the embodiment and the modifications described over, the manufacturing yield can be improved while the coupling loss is reduced.

Figure 10:
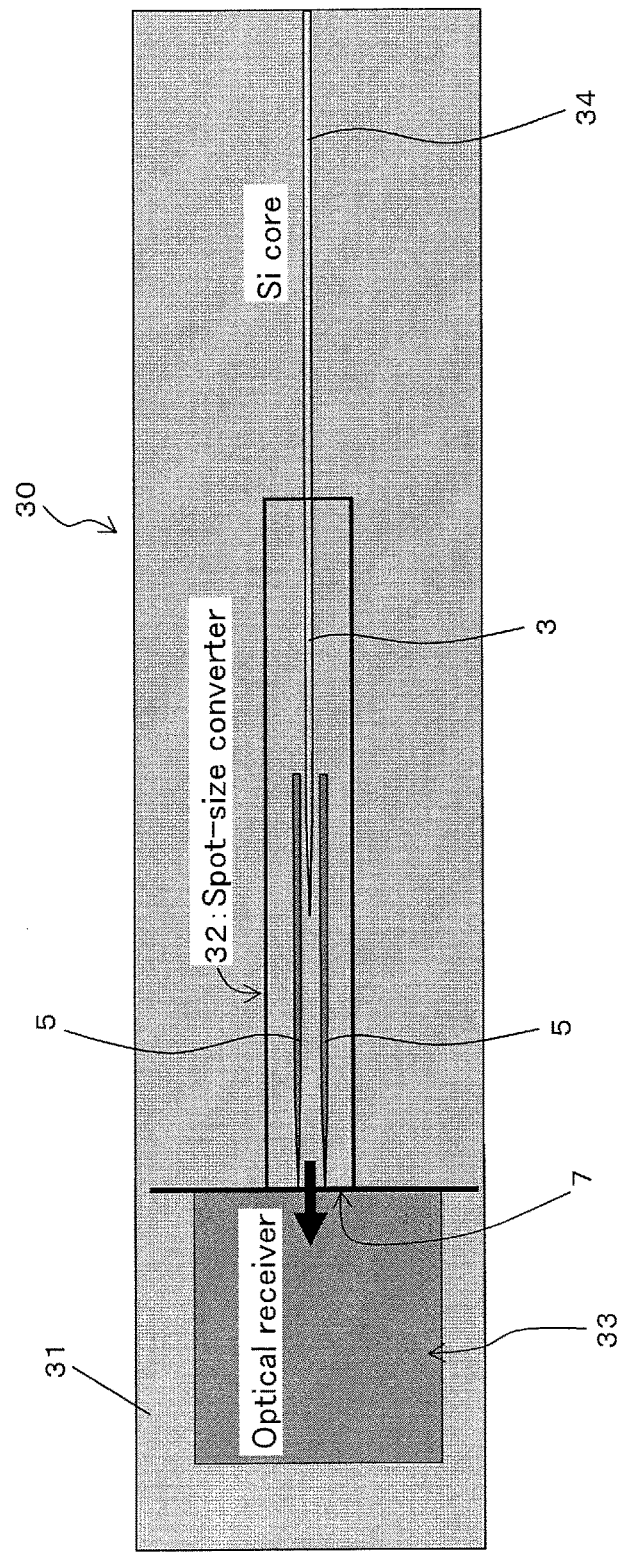
FIG. 10 is a schematic plan view depicting an optical receiver in which the spot size converter according to the present embodiment is used.

Also it is possible to use the spot size converter of any of the embodiment and the modifications described over to configure such an optical receiver 30 as depicted in FIG. 10. In this instance, the optical receiver 30 may include a substrate 31, a spot size converter 32 provided on the substrate 31 and configured in such a manner as in any of the embodiment and the modifications described hereinabove, and an optical detector 33 provided on the substrate 31, and the optical detector 33 may be configured to detect light inputted from the opposite side to the side of the end face 7 of the spot size converter 32 and outputted from side of the end face 7. In this case, the end face 7 of the spot size converter of any of the embodiment and the modifications described over to which light is inputted becomes an end face from which light is outputted, and light is inputted from the opposite side to the last-mentioned end face. It is to be noted that the optical detector 33 is referred to also as photoreceiver. For example, the optical receiver 30 can be implemented by mounting, on an SOI substrate, the spot size converter 32 configured in such a manner as in any of the embodiment and the modifications described over, and the optical detector 33 that detects light outputted from the spot size converter 32 (photoreceiver that receives the output light). In such an optical receiver 30 as just described, light is inputted from the Si core 34 connected to the Si core 3 of the spot size converter 32 to the spot size converter 32, and the spot size is converted by the spot size converter 32 when the light propagates in the region including the Si core 3 and the region including the plurality of (here, two) SiN cores 5. Then, the light propagates in the region (waveguide) including the plurality of (here, two) SiN cores 5 and is outputted from the end face 7. Then, the light outputted from the end face 7 of the spot size converter 32 is inputted to the optical detector 33 and converted into an electric signal by the optical detector 33. Such an optical receiver 30 as just described is advantageous in that, since it includes the spot size converter 32 of any of the embodiment and the modifications described over, the manufacturing yield can be improved while the coupling loss is reduced.

Figure 11:
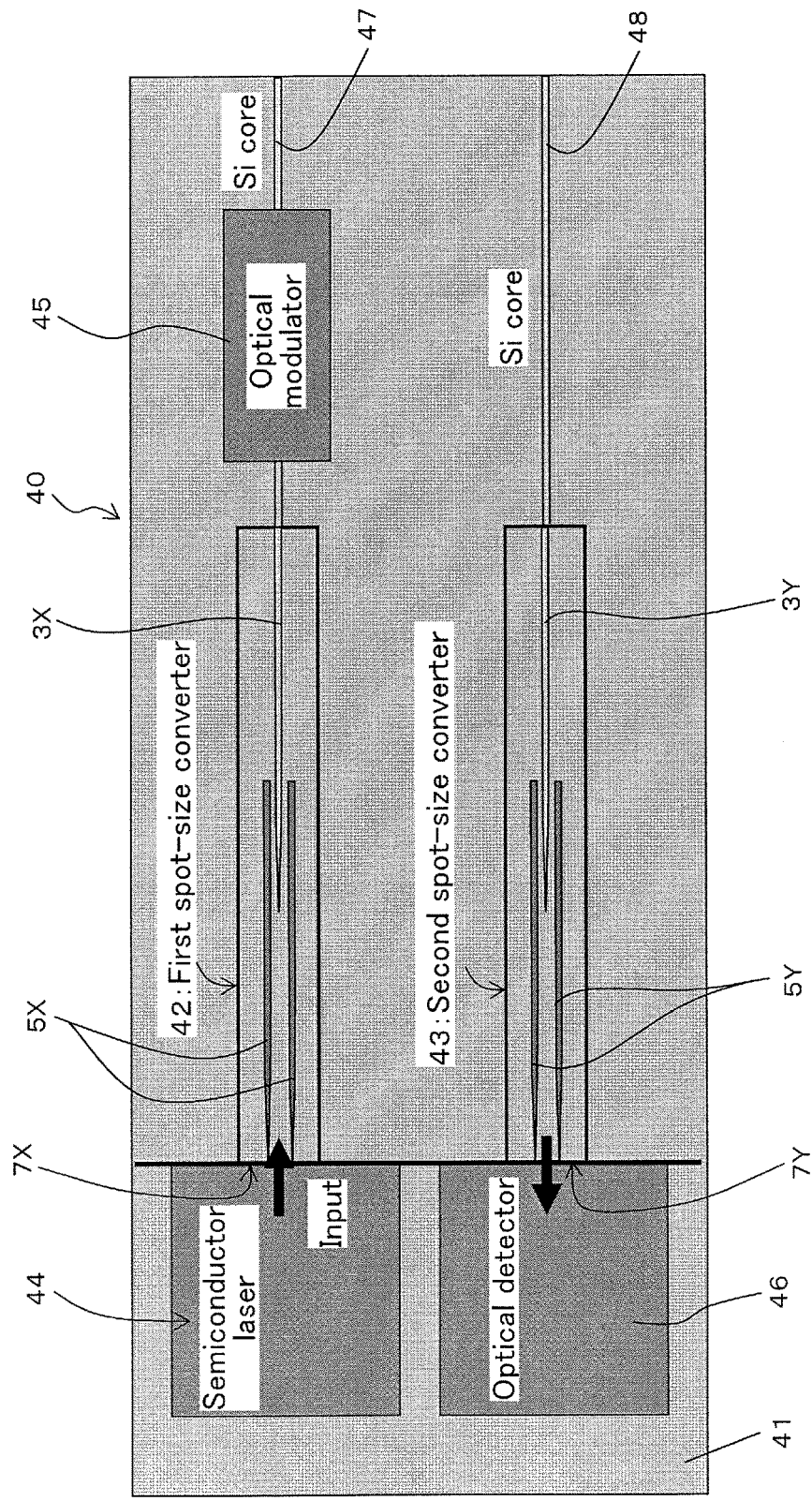
FIG. 11 is a schematic plan view depicting an optical transmitter-receiver in which the spot size converter according to the present embodiment is used.

Also it is possible to use the spot size converter of any of the embodiment and the modifications described over to configure such an optical transmitter-receiver 40 as depicted in FIG. 11. In this instance, the optical transmitter-receiver 40 may include a substrate 41, a first spot size converter 42 and a second spot size converter 43 provided on the substrate 41 and configured in such a manner as in any of the embodiment and the modifications described over, a light emitter 44 provided on the substrate 41, an optical modulator 45 provided on the substrate 41, and an optical detector 46 provided on the substrate 41. The light emitter 44 may output light toward an end face 7X of the first spot size converter 42, and the optical modulator 45 may modulate the light outputted from the opposite side to the side of the end face 7X of the first spot size converter 42. The optical detector 46 may detect the light inputted from the opposite side to the side of an end face 7Y of the second spot size converter 43 and outputted from the side of the end face 7Y. Here, the light emitter 44 may be configured using, for example, a semiconductor laser. Meanwhile, the optical modulator 45 may be configured using, for example, a Mach-Zehnder type optical modulator. Further, In the second spot size converter 43, the end face 7 to which light is inputted in the spot size converter of any of the embodiment and the modifications described over is the end face 7Y from which the light is outputted, and light is inputted from the opposite side to the side of the end face 7Y. For example, the optical transmitter-receiver 40 can be implemented by mounting, on an SOI substrate, the first spot size converter 42 configured in such a manner as in any of the embodiment and the modifications described over, the light emitter 44 that outputs light toward the end face 7X of the first spot size converter 42, the optical modulator 45 that modulates light outputted from the opposite side to the end face 7 of the first spot size converter 42, the second spot size converter 43 configured in such a manner as in any of the embodiment and the modifications described over, and the optical detector 46 that detects the light outputted from the second spot size converter 43. In such an optical transmitter-receiver 40 as just described, light outputted from the light emitter 44 is inputted from the end face 7X of the first spot size converter 42, and the spot size thereof is converted by the first spot size converter 42 when the light propagates in the region including the plurality of (here, two) SiN cores 5X and the region including the Si core 3X. Then, the light propagates in the region (waveguide) including the Si core 3X and is outputted from the opposite side to the end face 7X. Then, the light outputted from the opposite side to the end face 7X of the first spot size converter 42 is inputted to the optical modulator 45 and converted by the optical modulator 45, and a modulation signal is outputted to a Si core 47 provided on the output side of the optical modulator 45. Further, light is inputted from another Si core 48 connected to a Si core 3Y of the second spot size converter 43 to the second spot size converter 43, and the spot size thereof is converted by the second spot size converter 43 when the light propagates in the region including the Si core 3Y and the plurality of (here, two) SiN cores 5Y. Then, the light propagates in the region (waveguide) including the plurality of (here, two) SiN cores 5Y and is outputted from the end face 7Y. Then, the light outputted from the end face 7Y of the second spot size converter 43 is inputted to the optical detector 46 and converted into an electric signal by the optical detector 46. In such an optical transmitter-receiver 40 as just described, light generated by the light emitter can be outputted with the spot size thereof converted into a small spot size while the coupling loss is suppressed, and besides, the inputted light can be detected with the spot size thereof converted into a large size while the coupling loss of the light is suppressed. Such an optical transmitter-receiver 40 as described over is advantageous in that, since it includes the spot size converter of any of the embodiment and the modifications described over as each of the first and second spot size converters 42 and 43, the manufacturing yield can be improved while the coupling loss is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A spot-size converter, comprising:
a substrate;
a first core provided over the substrate; and
second and third cores provided over the substrate and over or under the first core with a cladding layer sandwiched therebetween and extending in parallel to the substrate and the first core,
wherein:
the first core is positioned between the second core and the third core as viewed from over,
the first core is terminated at a position spaced away from an end face to or from which light is inputted or outputted,
the first core includes an overlapping portion overlapping with the second core and the third core in a direction in which the first core, the second core and the third core extend, and
the overlapping portion of the first core ends at the position at which the first core is terminated.

2. The spot-size converter according to claim 1, wherein the first core has a first part opposed to the second and third cores and a second part contiguous to the first part, and
the second and third cores individually have a third part opposed to the first part and a fourth part contiguous to the opposite side of the third part to the side on which the second part is provided,
wherein the fourth parts of the second and third cores individually have a cross section perpendicular to a direction in which the fourth parts extend and increasing in size toward the third part.

3. The spot-size converted according to claim 2, wherein the first part has a cross section perpendicular to a direction in which the first part extends and increasing in size toward the second part.

4. The spot-size converted according to claim 2, wherein the fourth parts of the second and third cores extend to an end face of the substrate.

5. The spot-size converted according to claim 2, wherein the second part has a fixed sectional area.

6. The spot-size converted according to claim 2, wherein the third part has a fixed sectional area.

7. The spot-size converted according to claim 1, wherein a shape of the second core, a shape of the third core and a distance between the second and third cores are determined so that light is coupled to a region including the second and third cores.

8. The spot-size converted according to claim 1, wherein the first, second and third cores are provided such that optical coupling occurs from the second and third cores to the first core.

9. The spot-size converted according to claim 1, wherein the first core is a Si core;
the second and third cores are SiN cores; and
the cladding layer is a $SiO_2$ cladding layer.

10. The spot-size converter according to claim 1, wherein the second core and the third core are terminated at a position spaced away from the end face to or from which light is inputted or outputted.

* * * * *